US012756166B1

(12) United States Patent
Fletcher et al.

(10) Patent No.: US 12,756,166 B1
(45) Date of Patent: Oct. 6, 2026

(54) HARNESS SLEEVE WITH INNER PROTECTIVE SLEEVE

(71) Applicant: Brunswick Corporation, Mettawa, IL (US)

(72) Inventors: Derek J. Fletcher, Oshkosh, WI (US); Jeremy J. Kraus, Mt. Calvary, WI (US)

(73) Assignee: Brunswick Corporation, Mettawa, IL (US)

( * ) Notice: Subject to any disclaimer, the term of this patent is extended or adjusted under 35 U.S.C. 154(b) by 209 days.

(21) Appl. No.: 18/824,655

(22) Filed: Sep. 4, 2024

(51) Int. Cl.
*H02G 3/04* (2006.01)
*B63H 21/36* (2006.01)

(52) U.S. Cl.
CPC ........... *H02G 3/0406* (2013.01); *B63H 21/36* (2013.01)

(58) Field of Classification Search
None
See application file for complete search history.

(56) References Cited

U.S. PATENT DOCUMENTS 3,819,849 A * 6/1974 Baker .................. H01R 13/562 174/68.3
3,866,670 A * 2/1975 Cramer ................... F16L 53/70 165/47
4,869,683 A * 9/1989 Nelson ............... H01R 13/5213 439/367
5,147,216 A * 9/1992 Shotey ............... H01R 13/6392 439/367
5,273,454 A * 12/1993 Shotey ............... H01R 13/6392 439/367
6,018,874 A * 2/2000 Todd ...................... A01G 3/053 174/136
6,298,882 B1 * 10/2001 Hayes ..................... F16L 57/00 138/110
6,369,329 B1 * 4/2002 Moore ................. H02G 15/043 174/74 A
6,983,767 B2 * 1/2006 Rickards ................ F16L 57/00 138/104
7,104,856 B1 9/2006 Krupp
(Continued)

FOREIGN PATENT DOCUMENTS

EP 3930101 A1 12/2021
EP 3930108 A1 12/2021
(Continued)

OTHER PUBLICATIONS

Fletcher, Unpublished U.S. Appl. No. 17/939,474, filed Sep. 7, 2022.

(Continued)

*Primary Examiner* — Krystal Robinson
(74) *Attorney, Agent, or Firm* — Andrus Intellectual Property Law, LLP

(57) ABSTRACT

A harness sleeve includes an outer sleeve, an inner protective sleeve, and a strap. The outer sleeve is configured to be a female pairing to a guide member of a marine drive. The guide member is configured to be a male pairing to the outer sleeve. The inner protective sleeve is configured to be a male pairing to the guide member. The guide member is configured to be a female pairing to the inner protective sleeve. The strap is configured to secure the outer sleeve to the guide member.

20 Claims, 10 Drawing Sheets

(56) References Cited

U.S. PATENT DOCUMENTS

| | | | | |
|---|---|---|---|---|
| 7,119,279 | B2 * | 10/2006 | Niehaus | H02G 3/0487 174/DIG. 11 |
| 9,994,194 | B2 * | 6/2018 | Greene | B60R 13/06 |
| 10,017,136 | B1 * | 7/2018 | Waisanen | B63H 20/32 |
| 10,202,180 | B1 * | 2/2019 | Amerling | B63H 20/32 |
| 10,286,989 | B1 | 5/2019 | Amerling | |
| 10,627,019 | B1 * | 4/2020 | Franklin | F16L 57/00 |
| 10,710,691 | B2 | 7/2020 | Amerling | |
| 11,046,405 | B1 | 6/2021 | Groeschel | |
| 11,377,186 | B1 * | 7/2022 | Ahlswede | B63H 20/06 |
| 11,618,391 | B2 * | 4/2023 | Kimoto | H02G 3/0487 174/72 A |
| 11,791,614 | B2 * | 10/2023 | Kubo | H02G 15/1806 174/72 A |
| 12,438,318 | B2 * | 10/2025 | Taylor | H01R 31/06 |
| 2007/0137876 | A1 * | 6/2007 | Miettinen | H05K 5/069 174/50.56 |
| 2010/0276196 | A1 * | 11/2010 | Seraj | H02G 15/1833 174/84 R |
| 2011/0100671 | A1 * | 5/2011 | Seraj | H02G 1/14 29/592 |
| 2011/0123759 | A1 * | 5/2011 | Rodrigues | D03D 1/0043 428/100 |
| 2015/0051712 | A1 * | 2/2015 | DeWees | A61F 2/78 623/36 |
| 2015/0090489 | A1 * | 4/2015 | Eshima | H02G 3/0481 174/72 A |
| 2015/0194795 | A1 * | 7/2015 | Rohr | H01R 43/28 174/72 A |
| 2015/0340848 | A1 * | 11/2015 | Nakashima | H02G 1/00 427/508 |
| 2015/0348678 | A1 * | 12/2015 | Montena | H01B 11/1895 174/113 R |
| 2016/0006135 | A1 * | 1/2016 | Terashima | H01R 43/05 174/72 A |
| 2016/0021799 | A1 * | 1/2016 | Harris | D04C 1/06 87/9 |
| 2016/0059802 | A1 * | 3/2016 | Kanagawa | B60R 16/0215 174/72 A |
| 2016/0189828 | A1 * | 6/2016 | Oga | B60R 16/0215 174/72 A |
| 2016/0294176 | A1 * | 10/2016 | Krishnan | H02G 3/34 |
| 2019/0304629 | A1 * | 10/2019 | Blackburn | H01B 7/04 |
| 2020/0203939 | A1 * | 6/2020 | Gooding | H02G 9/08 |
| 2023/0079073 | A1 * | 3/2023 | Murata | B60R 16/0215 174/72 A |
| 2023/0092669 | A1 * | 3/2023 | Izawa | H05K 9/0098 174/72 A |
| 2023/0126857 | A1 * | 4/2023 | Saito | B60R 16/02 174/72 A |

FOREIGN PATENT DOCUMENTS

| | | | |
|---|---|---|---|
| EP | 4369560 | A2 | 5/2024 |
| EP | 4369561 | A2 | 5/2024 |
| EP | 4371869 | A1 | 5/2024 |
| WO | 2024015317 | A1 | 1/2024 |

OTHER PUBLICATIONS

Mceathron et al., Unpublished U.S. Appl. No. 17/972,691, filed Oct. 25, 2022.

Taylor et al., Unpublished U.S. Appl. No. 18/092,764, filed Jan. 3, 2023.

Przybyk et al., Unpublished U.S. Appl. No. 18/092,772, filed Jan. 3, 2023.

* cited by examiner

HARNESS SLEEVE WITH INNER PROTECTIVE SLEEVE

FIELD

The present disclosure relates to harness sleeves and particularly to harness sleeves with an inner protective sleeve for marine drives having rigging connectors.

BACKGROUND

The following U.S. Patents are incorporated by reference in entirety.

U.S. Pat. No. 11,377,186 discloses an apparatus for operably connecting a marine drive to a marine vessel. A transom bracket is configured for fixed attachment to the marine vessel and for attachment to the marine drive such that the marine drive is trimmable up and down relative to the marine vessel about a trim axis. The transom bracket has a sidewall with a rigging opening through which at least one elongated rigging member extends for operably connecting the marine drive to the marine vessel, wherein the rigging opening is located along the trim axis. The rigging device has an elbow conduit with an inlet end and an outlet end, wherein the outlet end is positionable into a plurality of clock positions relative to the inlet end.

U.S. Pat. No. 11,046,405 discloses a rigging hose housing provided to couple a rigging hose to a marine vessel. The rigging hose housing includes a radial mounting plate; an outer cylindrical wall extending perpendicularly from the radial mounting plate a first height above a bottom surface of the radial mounting plate; an inner cylindrical wall extending perpendicularly from the radial mounting plate a second height above the bottom surface of the radial mounting plate; and a gutter formed between the inner cylindrical wall and the outer cylindrical wall. The gutter terminates in a drain hole formed in the outer cylindrical wall. The drain hole is configured to permit the expulsion of fluid collected in the gutter from the rigging hose housing.

U.S. Pat. No. 10,710,691 discloses a marine drive including an engine and a cowl having first and second cowl portions. The first cowl portion is movable with respect to the second cowl portion into an open position in which the engine is manually accessible and a closed position in which the engine is enclosed; and a rigging port in the second cowl portion. The rigging port provides a passageway for rigging connectors extending from the engine to a component located remotely from the engine. A rigging opening provides manual access to the rigging connectors and the engine, including when the first cowl portion is in the closed position. A removable access door covers the rigging opening and prevents manual access to the engine and rigging connectors via the rigging opening. The removable access door is fastened to the second cowl portion by a removable fastener that is hidden from view.

U.S. Pat. No. 10,202,180 discloses an outboard motor including an engine coupled in torque-transmitting relationship with a propulsor via a driveshaft. A protective covering for the outboard motor includes a cowl that houses the engine within a closed interior thereof. An opening in an outer surface of the cowl provides access to the closed interior. A rigging tray can be inserted through the opening to a retracted position, in which a majority of the rigging tray is within the closed interior. A plurality of electrical lines extends from the engine and into the rigging tray from a first end thereof. Each electrical line in the plurality of electrical lines terminates in the rigging tray at a respective one of a plurality of electrical connectors. A second end of the rigging tray receives a complementary plurality of vessel electrical lines for connection to the plurality of engine electrical lines via the plurality of electrical connectors.

U.S. Pat. No. 10,017,136 discloses an outboard motor which can be coupled to a transom of a marine vessel via a rigging system. The rigging system includes a plurality of engine-sourced lines extending from an engine of the outboard motor, through an aperture in the motor housing, and to the marine vessel. A protective tube surrounds the plurality of engine-sourced lines and has a first end coupled to the motor housing and a second end coupled to the marine vessel. A rigging center is located aboard the marine vessel and holds distal ends of each of the engine-sourced lines. A plurality of connectors is provided on the distal ends of the engine-sourced lines. At the rigging center, each engine-sourced line is configured to be coupled, via a respective connector, to a corresponding vessel-sourced line. The vessel-sourced lines are in turn connected to respective engine-related devices aboard the marine vessel.

U.S. Pat. No. 7,104,856 discloses a rigging apparatus provided for an outboard motor in which an attachment member is shaped to be rigidly attached to a housing structure, or cowl, of an outboard motor, without the need for additional hardware such as clamps, brackets, or screws. The attachment member is shaped to receive a threaded sleeve in threaded association therewith so that hoses, wires, and cables can be protected within the threaded sleeve. An attachment member of the rigging apparatus is made to be asymmetrical to avoid improper assembly into an opening of the housing structure of an outboard motor.

SUMMARY

This Summary is provided to introduce a selection of concepts which are further described herein below in the Detailed Description. This Summary is not intended to identify key or essential features of the claimed subject matter, nor is it intended to be used as an aid in limiting scope of the claimed subject matter.

In non-limiting examples disclosed herein, a harness sleeve includes an outer sleeve, inner protective sleeve, and strap. The outer sleeve is configured to be a female pairing to a guide member of a marine drive. The guide member is configured to be a male pairing to the outer sleeve. The inner protective sleeve is configured to be a male pairing to the guide member. The guide member is configured to be a female pairing to the inner protective sleeve. The strap is configured to secure the outer sleeve to the guide member.

Certain examples may have the inner protective sleeve provide a barrier between a plurality of rigging connectors and a portion of the guide member.

The above examples are contemplated by the present disclosure in various combinations as further described herein below.

BRIEF DESCRIPTION OF THE DRAWINGS

Non-limiting examples are provided with reference to the following drawing figures. The same numbers are used throughout to reference like features and components.

FIG. 9-1 is a perspective view of the example harness sleeve partially installed on rigging connectors and guide member.

FIG. 9-2 is a perspective view of the example harness sleeve partially installed on rigging connectors and guide member.

FIG. 9-3 is a perspective view of the example harness sleeve partially installed on rigging connectors and guide member.

DETAILED DESCRIPTION

During research and development in the field of marine drives, the present inventors determined that rigging connectors extending from a marine drive to a marine vessel are often subject to potential damage from weather, saltwater, ultraviolet radiation, sharp objects, and the like. Typical rigging members may include but are not limited to hoses, wires, cables, and/or the like, which extend between a marine vessel and a marine drive coupled to the vessel's transom. For example, the electrical system of the marine drive often includes a variety of electrical control and power components. A wiring harness may extend between the marine drive and a helm of the marine vessel. The wiring harness may contain electrical lines that relay digital steering, throttle, and shift commands between the helm and the marine drive. Electrical lines relaying other types of control signals may also be present. Additionally, battery cables may extend between one or more batteries housed within the vessel and terminals provided on the outboard motor. Moreover, in marine drives having an engine, one or more fuel lines may supply fuel to the engine from a fuel tank housed within the vessel. Further, the marine drives may include a conduit, or guide member, for guiding the rigging members from the marine vessel, to within the cowling of the marine drive. However, the guide member may also cause damage to the rigging connectors by chafing their protective coatings. Through research and experimentation, the present inventors determined it would be advantageous to provide an example harness sleeve with inner protective sleeve. Using such a sleeve may protect the rigging from external hazards, and from the guide member itself. The present disclosure is a result of the present inventors' efforts in this regard.

Figure 1:
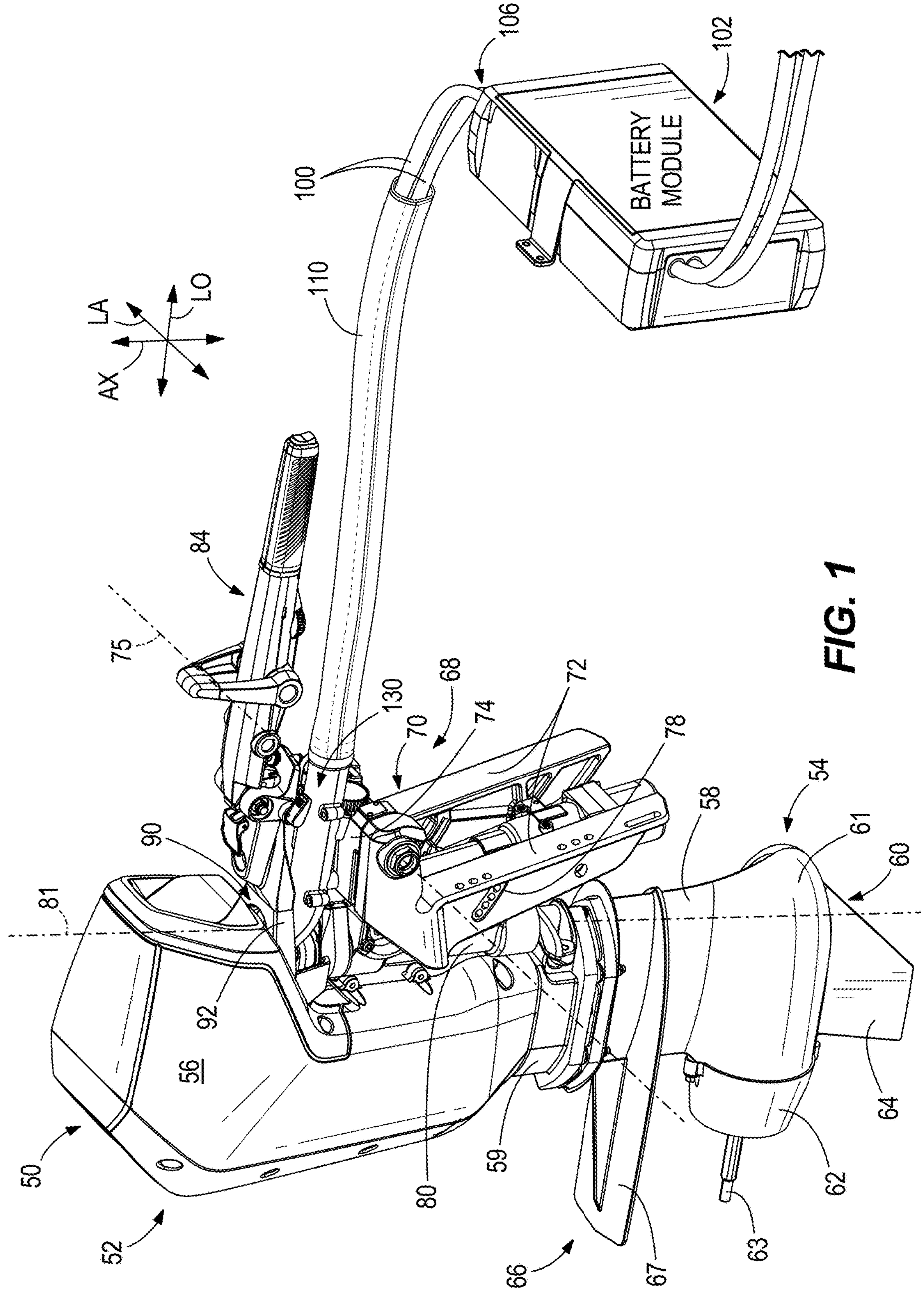
FIG. 1 depicts a marine drive for propelling a marine vessel in a body of water.

FIG. 1 depicts a marine drive 50 for propelling a marine vessel (not shown) in a body of water. In the illustrated example, the marine drive 50 extends from top to bottom in an axial direction AX, from front to back in a longitudinal direction LO which is perpendicular to the axial direction AX, and from side to opposite side in a lateral direction LA which is perpendicular to the axial direction AX and perpendicular to the longitudinal direction LO. The marine drive 50 includes an upper portion 52 and a lower portion 54. The upper portion 52 includes a cowling 56 that is fixed to and surrounds most or all of the body of a supporting frame 59, as further disclosed in U.S. Patent Application Publication No. 2024/0270365, the disclosure of which is hereby incorporated herein by reference in entirety.

The lower portion 54 of the marine drive 50 generally includes an extension leg 58 which is coupled to the supporting frame 59 of the upper portion 52 and extends downwardly to a lower housing unit 60. The lower housing unit 60 has a front housing portion 61 and a rear housing portion 62 that are mated together and define a watertight lower housing cavity. The front housing portion 61 has a nosecone with a smooth outer surface which transitions to the upwardly extension leg 58 and a downwardly extending skeg 64. An anti-ventilation plate 66 is positioned between an upper end and a lower end of the extension leg 58 and includes a generally flat plate 67 which extends rearwardly from the extension leg 58. A conventional propulsor (not shown) is mounted on the outer end of the propulsor shaft 63 extending from the lower housing unit 60 such that rotation of the propulsor shaft 63 causes rotation of the propulsor, which in turn generates a thrust force for propelling the marine vessel in water. The type and configuration of the propulsor can vary, and for example can include one or more propellers, impellers, and/or the like.

A transom bracket assembly 68 is configured to mount the marine drive 50 to the transom of the marine vessel. The type and configuration of the transom bracket assembly 68 can vary from what is shown. In the illustrated example, the transom bracket assembly 68 includes a transom bracket 70, which has a pair of clamp brackets 72, and a swivel bracket 74 located between the clamp brackets 72. The clamp brackets 72 are configured to be fixedly coupled to the transom. The swivel bracket 74 is pivotable with respect to the clamp brackets 72 about a pivot shaft (not shown) that laterally extends through the forward upper ends of the clamp brackets 72, thereby defining a trim axis 75. Pivoting of the swivel bracket 74 about the pivot shaft trims the marine drive 50 relative to the marine vessel, for example out of and/or back into the body of water in which the marine vessel is operated. A selector bracket 78 having holes is provided on at least one of the clamp brackets 72. Holes respectively become aligned with a corresponding mounting hole on the swivel bracket 74 at different selectable trim positions for the marine drive 50. A selector pin (not shown) can be manually inserted into the aligned holes to thereby lock the marine drive 50 in place with respect to the trim axis 75, all as is conventional.

Additionally, the marine drive 50 is supported on the swivel bracket 74 by a steering arm 90 and a steering tube (not shown) which is fixed to the steering arm 90 and seated in a swivel cylinder 80 of the swivel bracket 74. The marine drive 50 can be steered left or right relative to the marine vessel by rotating about a steering axis 81 defined by the steering tube and swivel cylinder 80, via a manually operable tiller 84 secured to a first end 92 of the steering arm 90. The illustrated tiller 84 is a conventional item, and the type and configuration of the tiller 84 can vary from what is shown. Suitable examples of a tiller 84 are disclosed in U.S. Pat. Nos. 10,246,173; 9,789,945; and 9,783,278; which are also incorporated herein by reference. Note however that many of the concepts of the present disclosure are not limited for use with marine drives having tiller arms, and in fact could be implemented in marine drives which do not have a tiller arm and/or have automatic steering systems or any other known apparatus for steering a marine drive with respect to a marine vessel.

A rigging connector 100 is configured to supply power to the marine drive 50 and extends from a location on the marine vessel to the cowling interior (not shown) through a guide member 130. In the illustrated embodiments, the marine drive 50 includes two rigging connectors 100 which extend from first ends (not shown), which are located in the cowling interior, to second ends 106 connected to a battery module 102 on the marine vessel, as illustrated in FIG. 1. As illustrated in FIG. 1, the guide member 130 is configured to guide the rigging connectors 100 through the steering arm 90 and over the transom bracket assembly 68. Additionally, according to one embodiment of the present disclosure, an example harness sleeve with inner protective sleeve 110 is secured to the guide member 130, and covers the rigging connectors 100. Further, the example harness sleeve with inner protective sleeve 110 provides protection to the rigging connectors 100 from the guide member 130.

Figure 2:
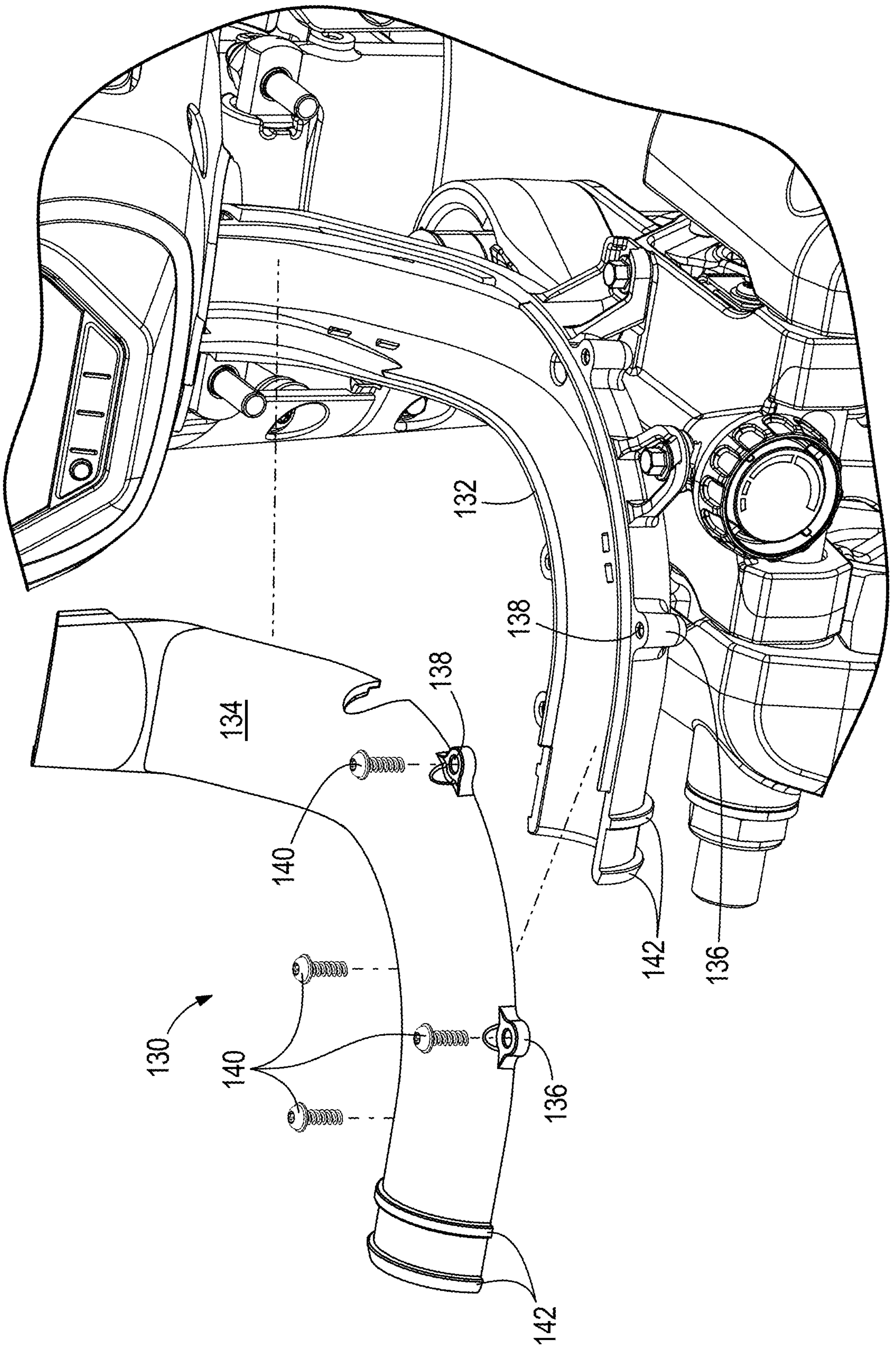
FIG. 2 is an exploded perspective view of the guide member of FIG. 1.

FIG. 2 is an exploded perspective view of the guide member 130 of FIG. 1. As shown, the illustrated guide member 130 includes a base member 132 and a cover 134 which is removable from the base member 132. Mounting protrusions 136 extend from opposite lateral sides of the base member 132 and the cover 134. Each mounting protrusion 136 includes a through-bore 138 that extends through the mounting protrusion 136 from an upper surface to a lower surface thereof. The mounting protrusions 136 on the cover 134 are each arranged in vertical alignment with a corresponding one of the mounting protrusions 136 on the base member 132 so that the fasteners 140 may be inserted through the through-bores 138 in corresponding mounting protrusions 136 to secure the cover 134 to the base member 132. In some embodiments, the guide member 130 may be bolted in place such that the guide member 130 remains stationary when the marine drive 50 is trimmed about the trim axis 75 (as described with respect to FIG. 1). Additionally, the guide member 130 includes two ridges 142, which may be useful for securing the example harness sleeve with inner protective sleeve 110 (described with respect to FIG. 1) to the guide member 130. More specifically, one end of the example harness sleeve with inner protective sleeve 110 may be secured in between the ridges 142, such that movement of the example harness sleeve with inner protective sleeve 110 (along the guide member 130) may be mitigated. Additionally, the example harness sleeve with inner protective sleeve 110 may provide additional securing of the base member 132 and the cover 134. When coupled together, the base member 132 and the cover 134 of the guide member 130 together define a guide passage through which the rigging connectors 100 (not shown) extend. As stated previously, the example harness sleeve with inner protective sleeve 110 may protect the rigging connectors 100 from chafing against the guide member 130, and the contact point between the base member 132 and cover 134.

Figure 3:
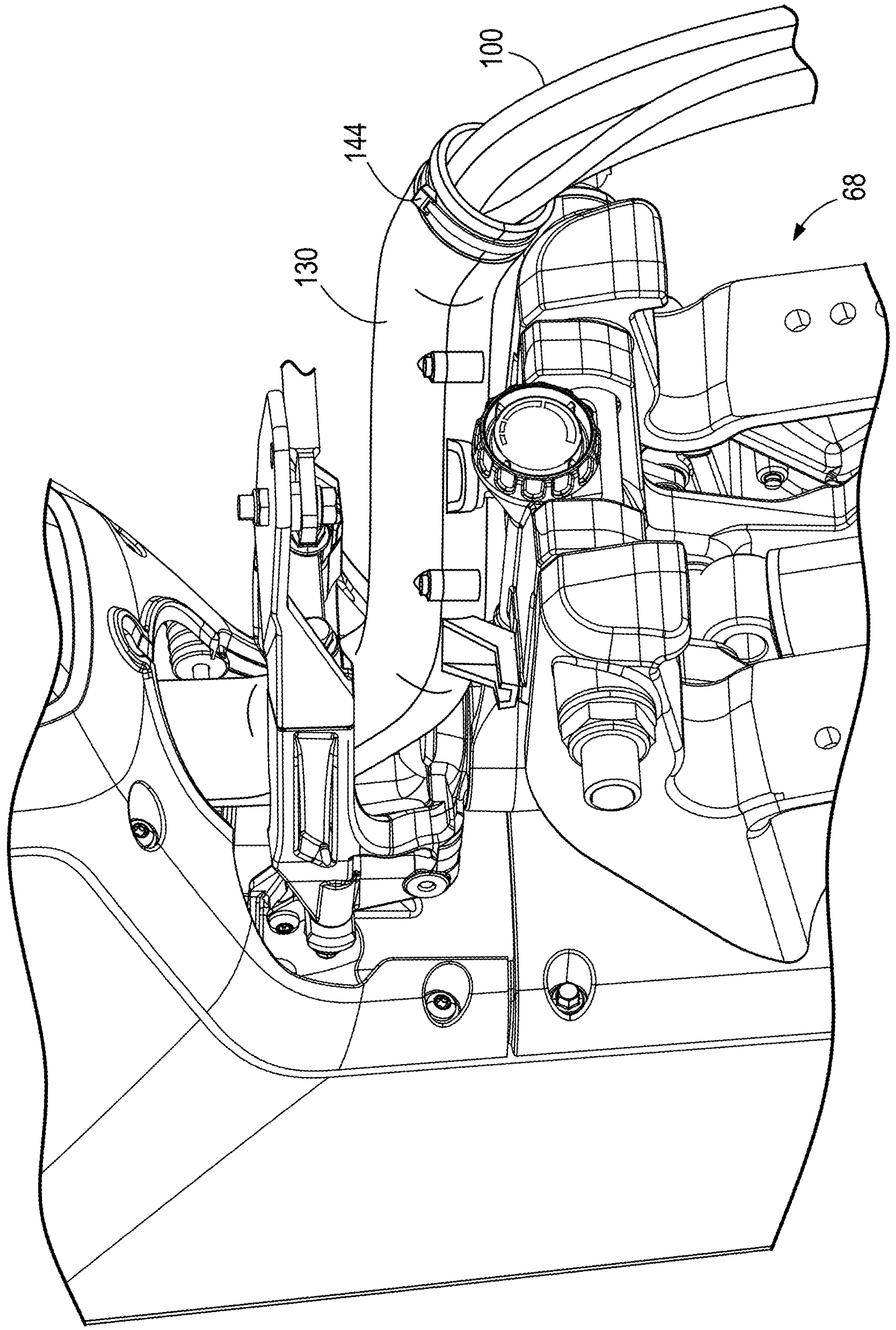
FIG. 3 is an exploded perspective view of the marine drive and guide member of FIG. 1.

FIG. 3 is an exploded perspective view of the marine drive 50 and guide member 130 of FIG. 1. According to one embodiment of the present disclosure, the end of the guide member 130 may be secured by a zip tie 144. In such embodiments, the example harness sleeve with inner protective sleeve 110 (not shown) may be secured over the zip tie 144. Alternatively, the zip tie 144 may be secured over the example harness sleeve with inner protective sleeve 110, which may increase the friction between the example harness sleeve with inner protective sleeve 110 and the guide member 130. Additionally, the guide member 130 may be positioned differently with respect to the transom bracket assembly 68 in various embodiments of the present disclosure. In this example, the guide member 130 is positioned in a direction approximately perpendicular to the face of the transom bracket assembly 68.

Figure 4:
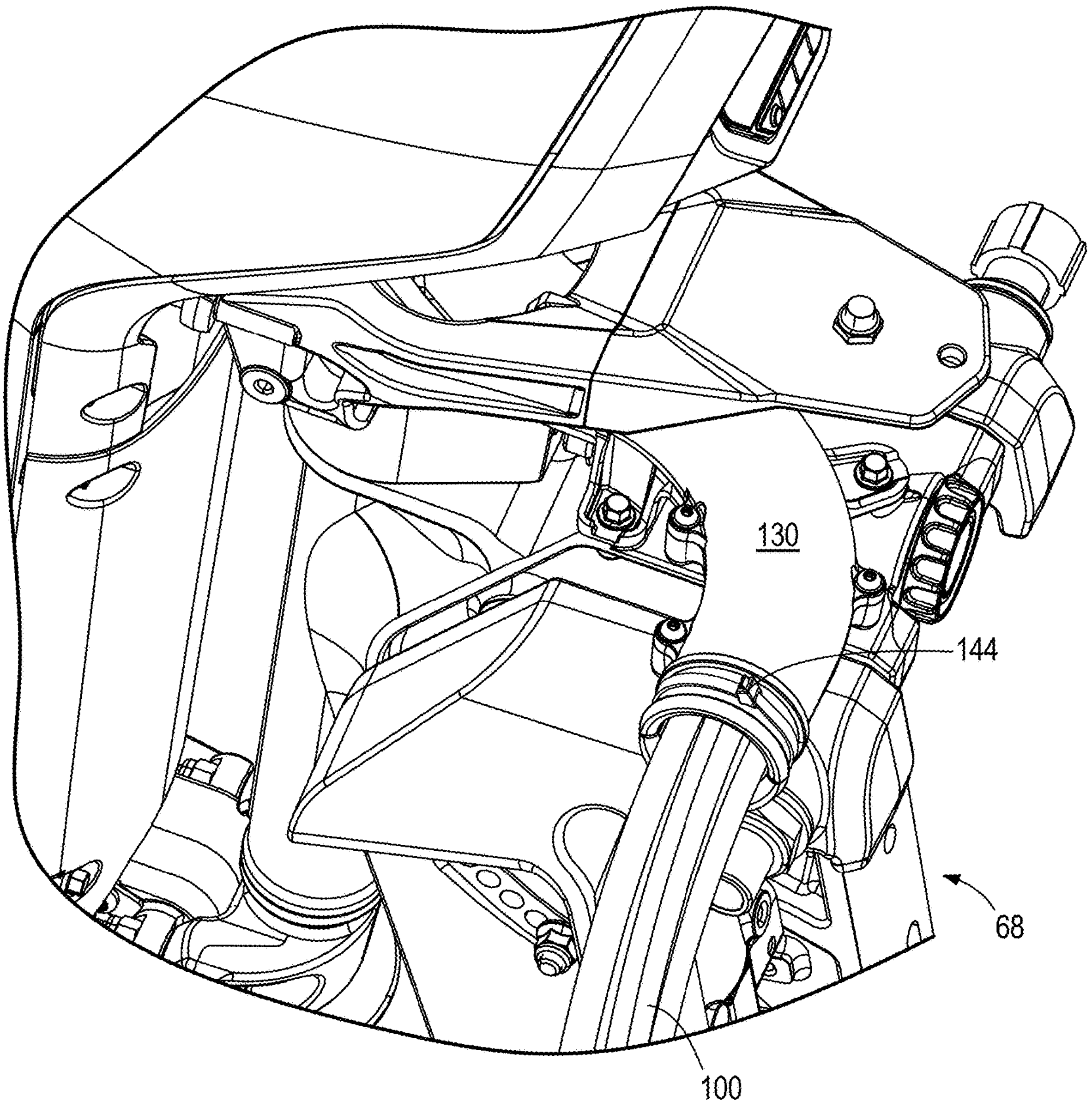
FIG. 4 is an exploded perspective view of the marine drive and guide member of FIG. 1.

FIG. 4 is an exploded perspective view of the marine drive 50 and guide member 130 of FIG. 1. According to one embodiment of the present disclosure, the end of the guide member 130 may be secured by a zip tie 144. In such embodiments, the example harness sleeve with inner protective sleeve 110 (not shown) may be secured over the zip tie 144. As stated previously, the guide member 130 may be positioned differently with respect to the transom bracket assembly 68 in various embodiments of the present disclosure. In this example, the guide member 130 is positioned in a direction approximately parallel to the face of the transom bracket assembly 68.

Figure 5:
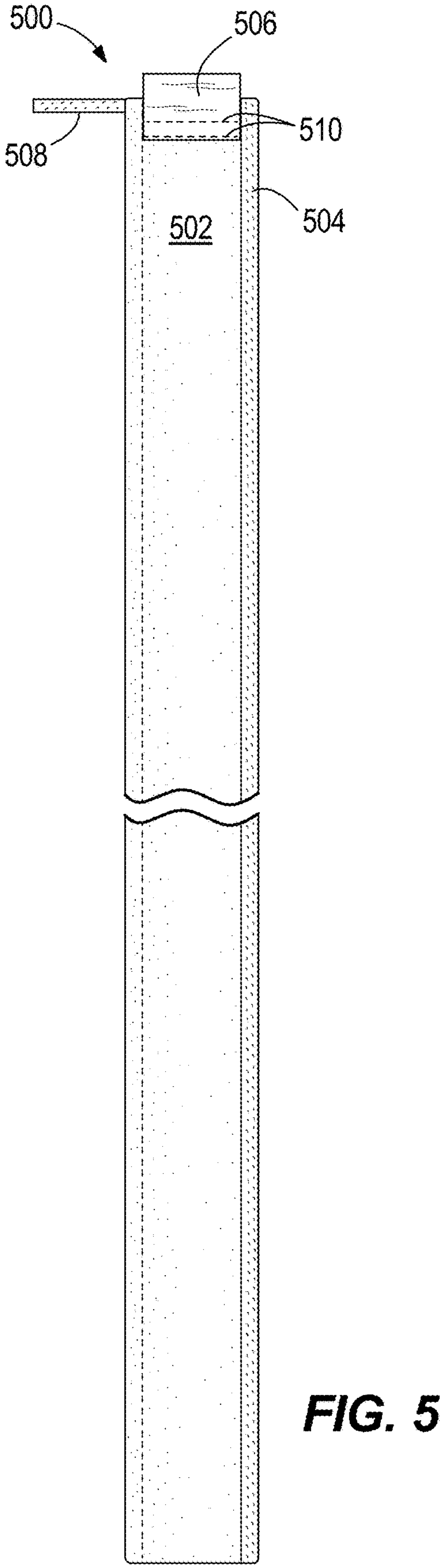
FIG. 5 is a side view of an example harness sleeve with inner protective sleeve in an open state.

FIG. 5 is a side view of an example harness sleeve 500 in an open state. The example harness sleeve 500 includes an outer sleeve 502, fastener 504, inner protective sleeve 506, and securing strap 508. The outer sleeve 502 may be a rectangular sheet of stretchable, weather-resistant material, such as neoprene, or other like material. Additionally, the length of the outer sleeve 502 may approximate the length of the rigging connectors 100 between the end of the guide member 130 and one or more connections on the marine vessel. Further, the width of the outer sleeve 502 may approximate the circumference of the guide member 130. For example, the width of the outer sleeve 502 may approximate 7-8 inches. In this way, it may be possible to fasten the end of the outer sleeve 502 around the end of the guide member 130, to mitigate movement of the outer sleeve 502 along the length of the guide member 130.

The fasteners 504 may have a pair of elements capable of securing the outer sleeve 502 to itself around the end of the guide member 130, and along the length of the rigging connectors 100. In this way, the outer sleeve 502 may be secured to the guide member 130 and rigging connectors 100, thus mitigating damage to the rigging connectors 100 from external hazards. In this example, one fastener 504 is visible, and the other is not. Rather, the other fastener 504 may be positioned on the other side of the outer sleeve 502, starting from the left edge, and extending potentially across the full horizontal width of the outer sleeve 502, depending on the type of fastener used. In some embodiments, the fasteners 504 may include hook and loop Velcro®, snaps, buttons, a zipper, and the like. The inner protective sleeve 506 may be a rectangular material, which may be more rigid, more slippery, and thinner than the material of the outer sleeve 502. In this way, it may be easier to insert the inner protective sleeve 506 within the guide member 130, than if the inner protective sleeve 506 was a similar material to the outer sleeve 502. Additionally, the material of the inner protective sleeve 506 may be abrasion resistant. In this way, the inner protective sleeve 506 may be less likely to cause chafing, or other contact damage to the rigging connectors 100. Further, the stitching 510 may fix the inner protective sleeve 506 to the outer sleeve 502. As shown the stitching 510 may include two sets of stitches. However, in some embodiments of the present disclosure, the stitching may include more or fewer sets of stitches. Additionally, the stitching 510 may fix the inner protective sleeve 506 in a position where the inner protective sleeve 506 extends beyond the upper edge of the outer sleeve 502. In this way, when the outer sleeve 502 is secured to the guide member 130, the end of the inner protective sleeve 506 may be positioned to extend from within the guide member 130 to the outside of the guide member 130 where the inner protective sleeve 506 is attached to the outer sleeve 502. Accordingly, the inner protective sleeve 506 may mitigate chafing of the rigging connectors 100 against the end of the guide member 130 by forming a barrier between the rigging connectors 100 and the guide member 130. In some embodiments of the present disclosure, the stitching 510 may provide a stop edge for the guide member 130 that prevents the inner protective sleeve 506 from insertion beyond a predetermined point within the guide member 130. Further, some embodiments of the present disclosure may use other methods or materials for attaching the inner protective sleeve 506 with the outer sleeve 502, such as Velcro®, buttons, snaps, and the like.

The strap 508 may be a relatively narrow length of material that includes fasteners on either side. Additionally, the strap 508 may be a separate piece of material from the outer sleeve 502, and attached to the outer sleeve 502 with stitching. The fasteners of the strap 508 may be similar to the fasteners 504. Accordingly, once the end of the outer sleeve 502 is wrapped around the end of the guide member 130, and fastened to itself using the fasteners 504, the strap 508 may be secured to itself, and around the outer sleeve 502 to mitigate movement of the outer sleeve 502 along the length of the guide member 130. In other words, securing the strap 508 around the outer sleeve 502 may increase the friction between the outer sleeve 502 and the guide member 130, which may mitigate movement of the outer sleeve 502 (and the attached inner protective sleeve 506) along the length of the guide member 130. As shown, the outer sleeve 502 includes a vertical stitching with which the strap 508 may be attached to the outer sleeve 502. Leaving the space between the vertical stitches and the edge of outer sleeve 502 makes it possible for the strap 508 to pull and/or stretch the outer sleeve 502 around the guide member 130 to provide a more secure fit.

Figure 6:
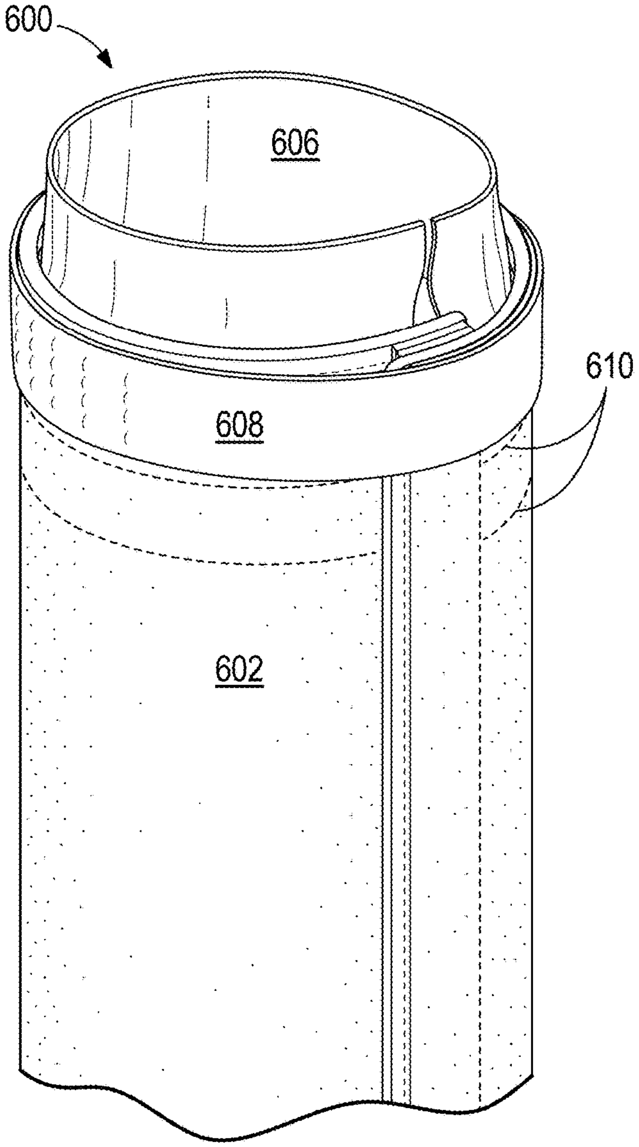
FIG. 6 is a side view of an example harness sleeve with inner protective sleeve in a closed state.

FIG. 6 is a side view of a portion of an example harness sleeve 600. The example harness sleeve 600 is shown in a closed state, where the visible elements include an outer sleeve 602, inner protective sleeve 606, strap 608, and stitching 610. The outer sleeve 602, inner protective sleeve 606, strap 608, and stitching 610 are similar to the outer sleeve 502, inner protective sleeve 506, strap 508, and stitching 510 described with respect to FIG. 5. In the closed state, the fastener elements (e.g., fastener 504 described with respect to FIG. 5) of the example harness sleeve 600 are fastened, and thus not visible.

Figure 7:
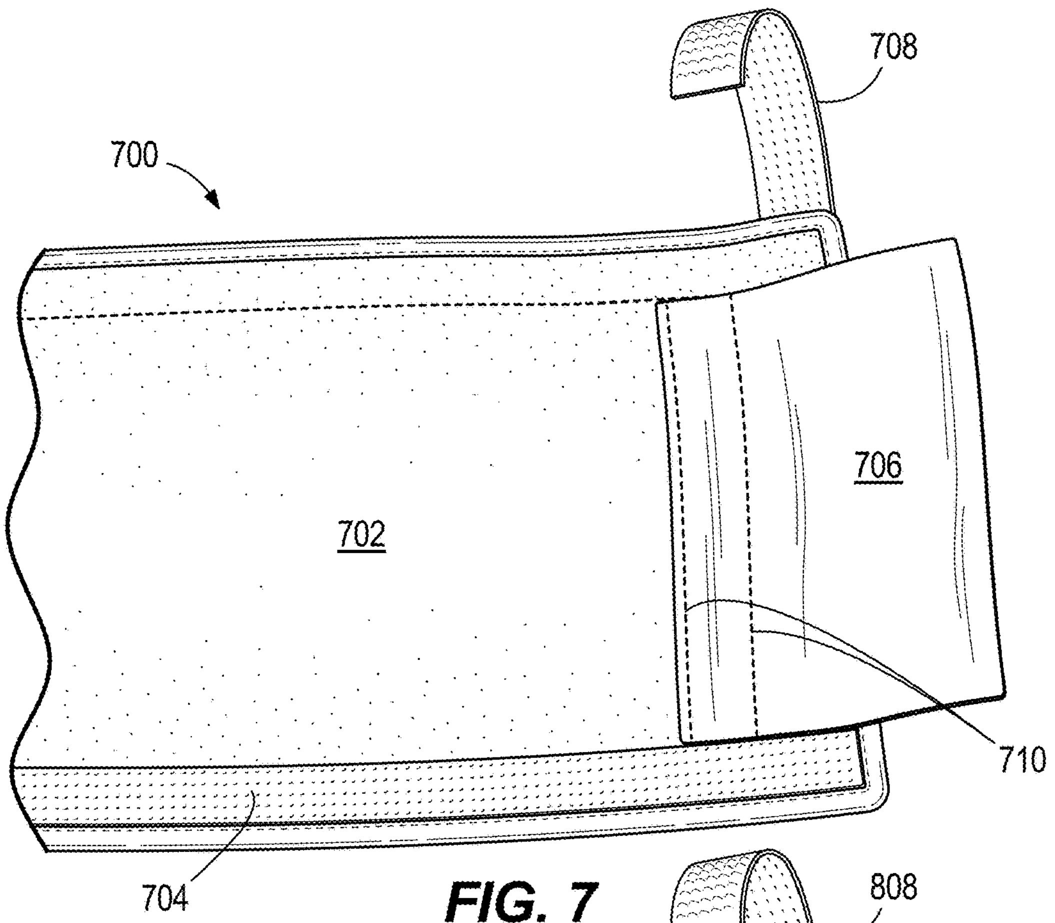
FIG. 7 is a side view of an example harness sleeve with inner protective sleeve.

FIG. 7 is a side view of a portion of an example harness sleeve 700 with inner protective sleeve. The example harness sleeve 700 includes an outer sleeve 702, fastener 704, inner protective sleeve 706, strap 708, and stitching 710, which are similar to the outer sleeve 502, fastener 504, inner protective sleeve 506, strap 508, and stitching 510, described with respect to FIG. 5. As shown, the stitching 710, which secures the inner protective sleeve 706 to the outer sleeve 702, spans the entire width of the inner protective sleeve 706. As stated previously, the outer sleeve 702 may be secured around the outside of the guide member 130, and around rigging connectors 100. Additionally, the inner protective sleeve 706 may be positioned around the rigging connectors 100, extending from within the guide member 130 to outside the guide member 130. Further, in securing the example harness sleeve 700 to the guide member 130, the inner protective sleeve 706 may slide inside the guide member 130. Accordingly, the rightmost stitches (as shown) of the stitching 710 may provide a stop that prevents the leftmost end of the inner protective sleeve 706 from sliding beyond a predetermined position within the guide member 130. While the stitching 710 includes two lengths of stitches, according to some embodiments of the present disclosure, the stitching 710 may include one or more lengths of stitches.

Figure 8:
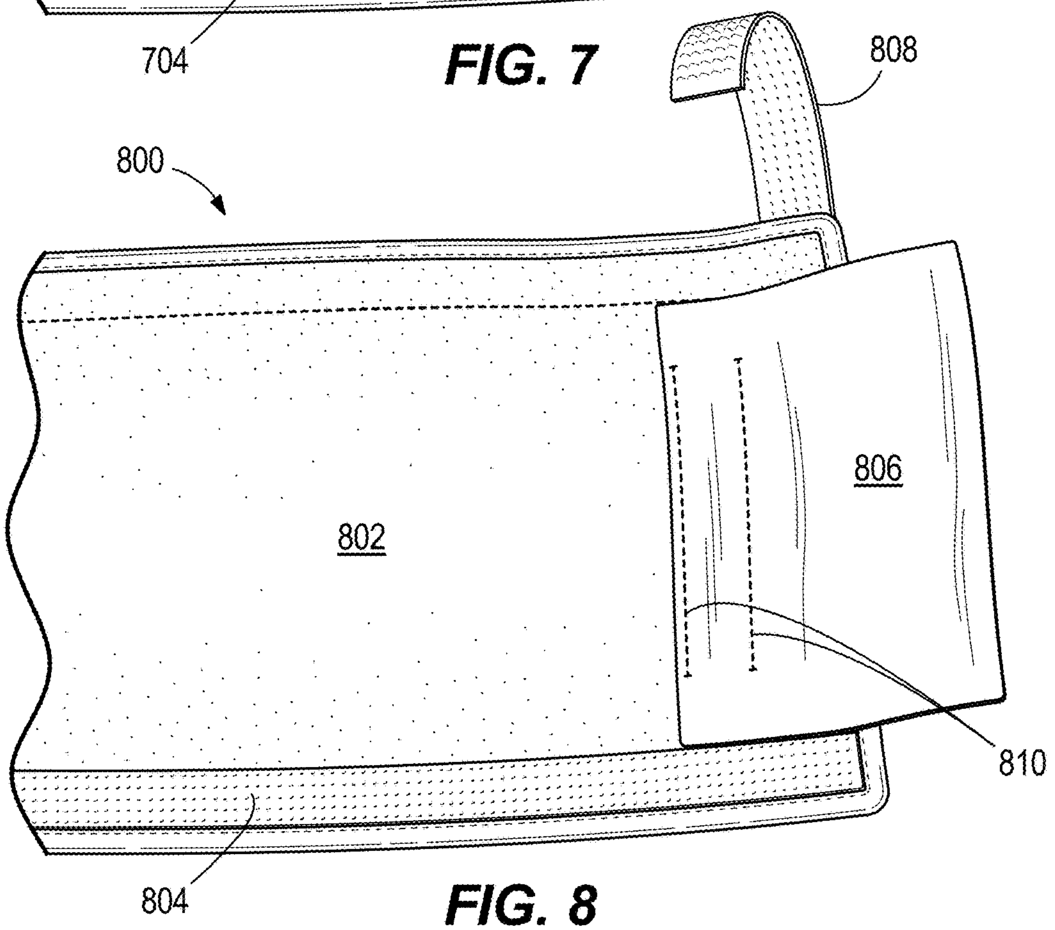
FIG. 8 is a side view of an example harness sleeve with inner protective sleeve.

FIG. 8 is a side view of a portion of an example harness sleeve 800 with inner protective sleeve. The example harness sleeve 800 includes an outer sleeve 802, fastener 804, inner protective sleeve 806, and strap 808, which are similar to the outer sleeve 702, fastener 704, inner protective sleeve 706, and strap 708, described with respect to FIG. 7. Additionally, the example harness sleeve 800 includes stitching 810, which secures the inner protective sleeve 806 to the outer sleeve 802, similar to the stitching 710, described with respect to FIG. 7. However, in contrast to the stitching 710, the stitching 810 spans a portion of the width of the inner protective sleeve 806. As stated previously, the outer sleeve 802 may be composed of a flexible, e.g., stretchable, material, such as a neoprene fabric. Additionally, the inner protective sleeve 806 may be a material that is more rigid, more slippery, and thinner than the material of the outer sleeve 802. Additionally, the material of the inner protective sleeve 806 may be abrasion resistant. However, the stitching 810 may limit the flexibility of the outer sleeve 802 and inner protective sleeve 806. Accordingly, using a more narrow width for the stitching 810 makes it possible to stretch the material of the outer sleeve 802 and inner protective sleeve 806 more than is possible with the wider stitching 710, described with respect to FIG. 7. Additionally, the stitching 810, described with respect to FIG. 8 is merely an example of the potential width. Some embodiments of the present disclosure may incorporate stitching that is wider (or more narrow) than the stitching 810.

Figures 1, 9:
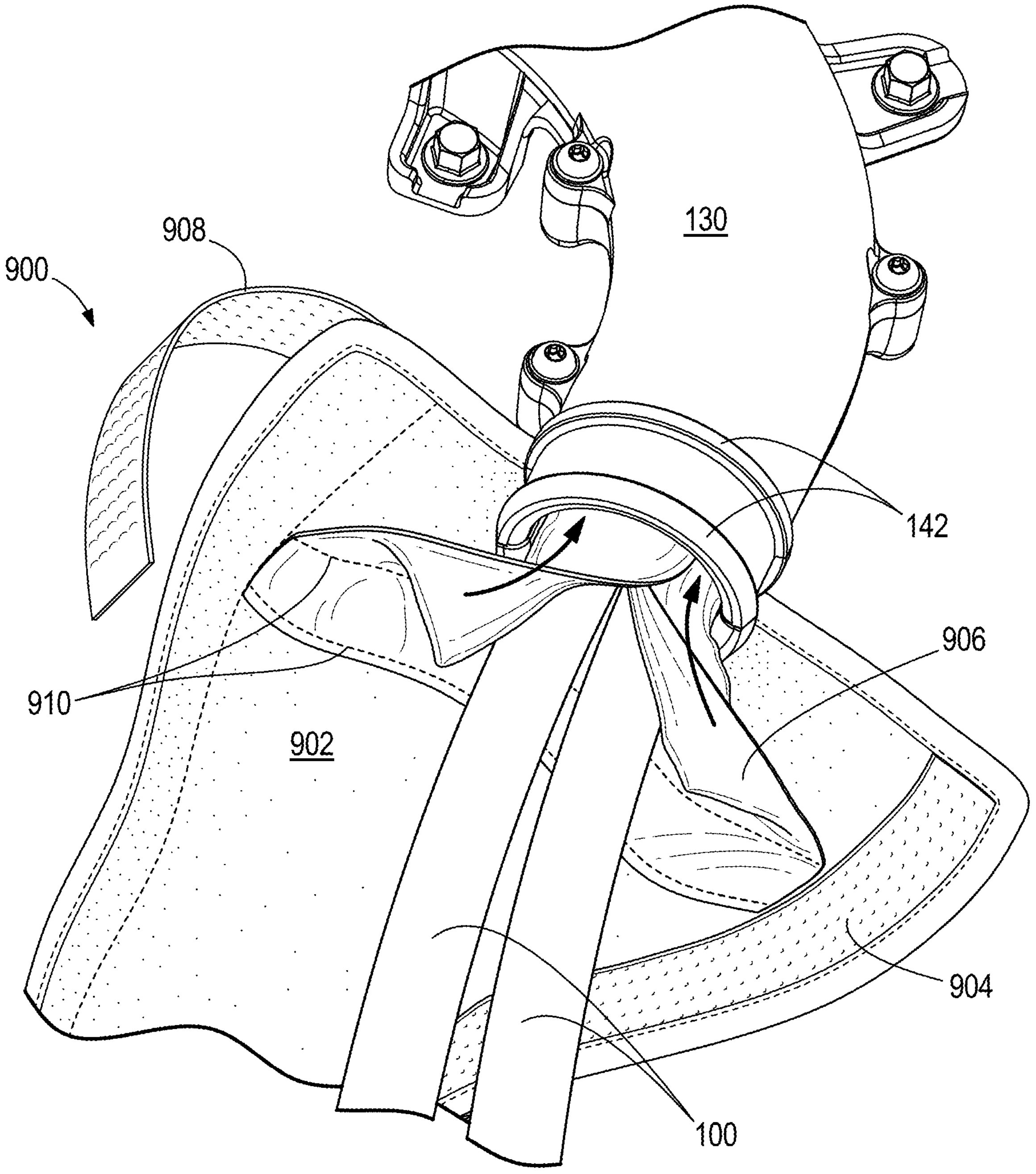
Figures 2, 9:
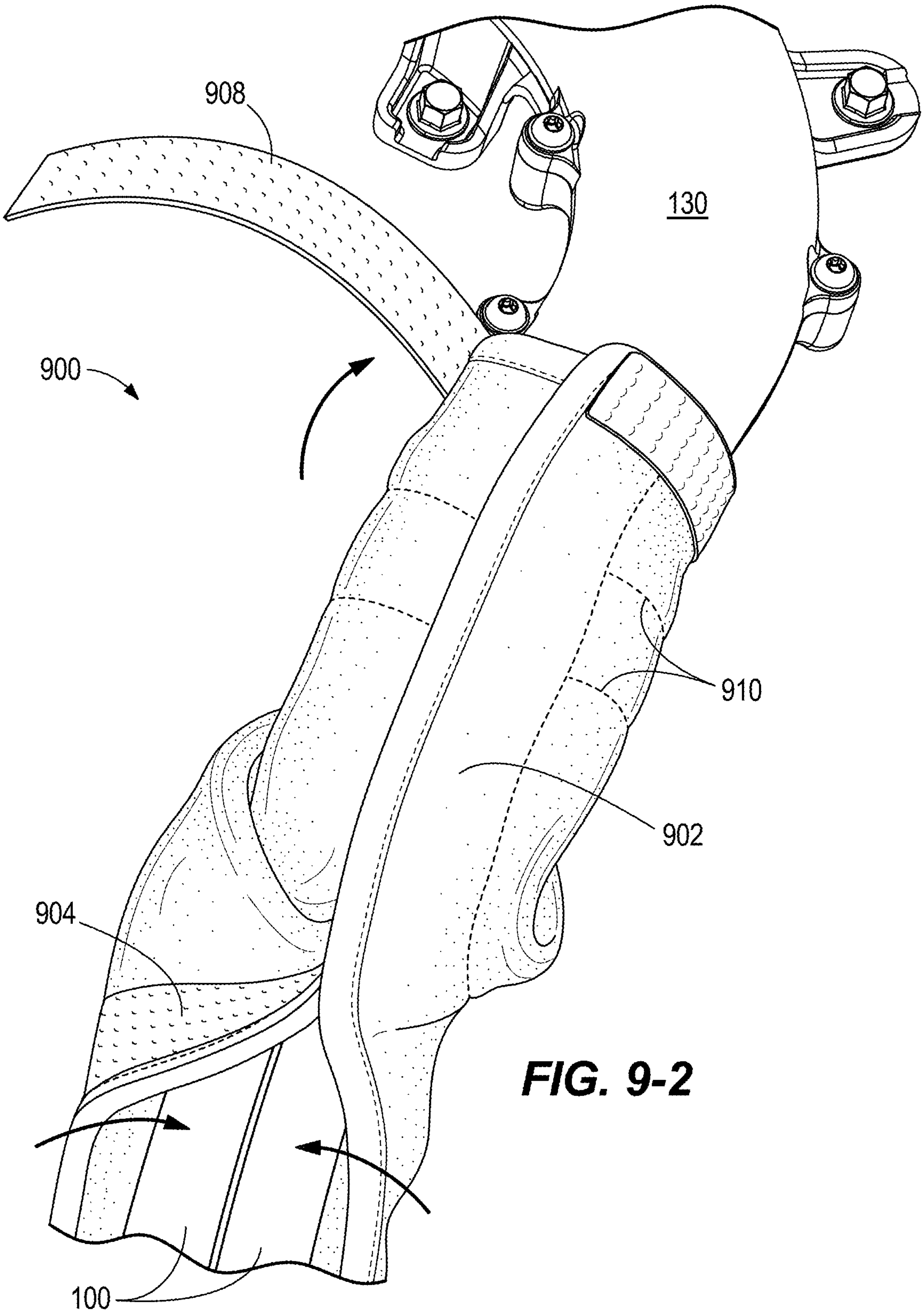
Figures 3, 9:
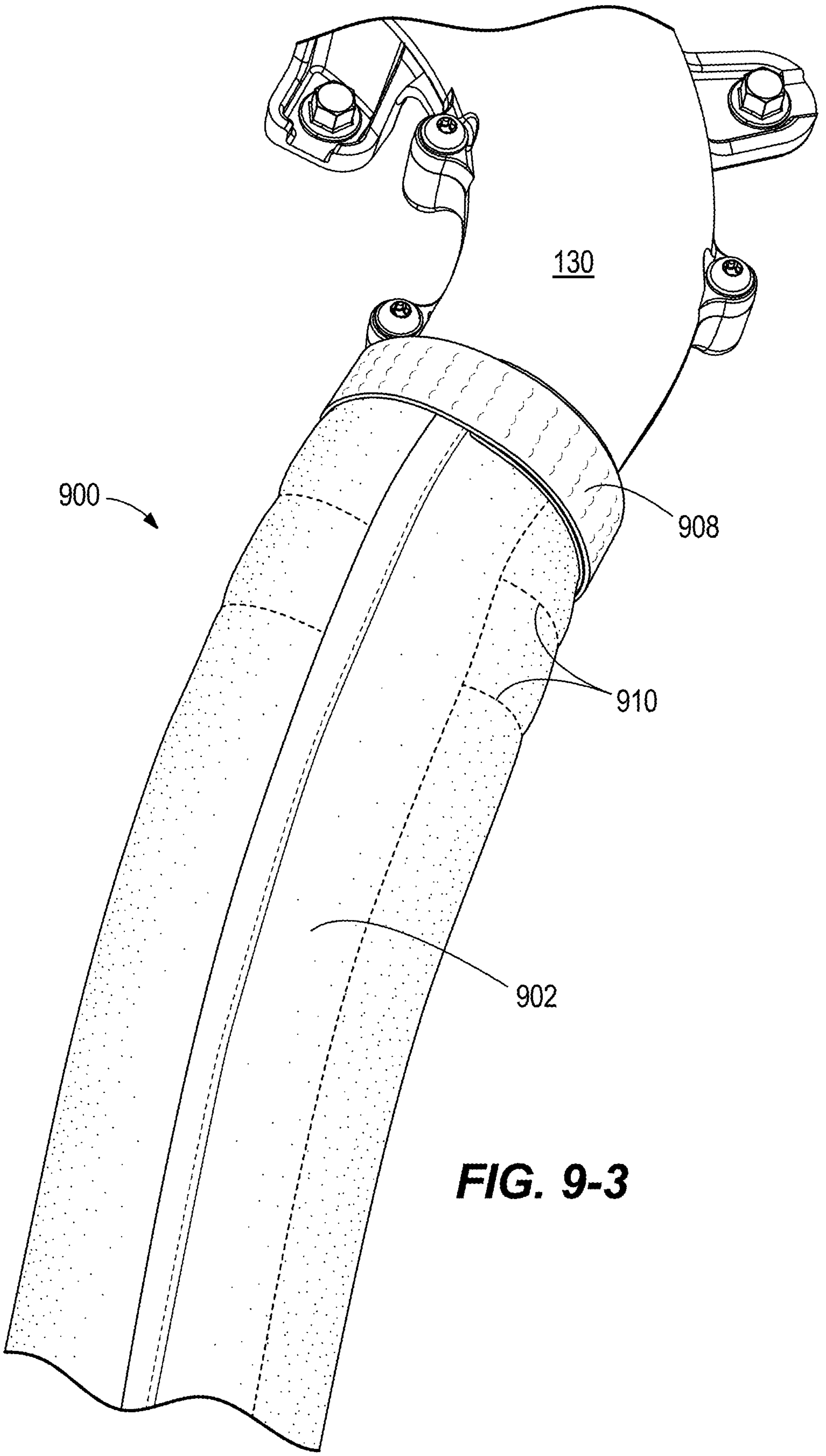

FIGS. 9-1, 9-2, 9-3 depict a process for installing an example harness sleeve 900 with inner protective sleeve on a guide member 130 according to one embodiment of the present disclosure. FIG. 9-1 is a perspective view of the example harness sleeve 900 with inner protective sleeve partially installed on rigging connectors 100 and guide member 130. The example harness sleeve 900 includes outer sleeve 902, fastener 904, inner protective sleeve 906, strap 908, and stitching 910, which are similar to the outer sleeve 502, fastener 504, inner protective sleeve 506, strap 508, and stitching 510, described with respect to FIG. 5. As stated previously, the inner protective sleeve 906 may be wrapped around the rigging connectors 100 and inserted within the guide member 130. Accordingly, the inner protective sleeve 906 is shown partially wrapped around the rigging connectors 100, and partially inserted within the guide member 130. Additionally, the outer sleeve 902 is shown in an open state, and with the end of the outer sleeve 902 positioned beneath the ridges 142 of the guide member 130. Accordingly, the end of the outer sleeve 902 can be fastened in the region between the ridges 142, as described below.

FIG. 9-2 is a perspective view of the example harness sleeve 900 with inner protective sleeve that is partially installed on rigging connectors 100 and guide member 130. As shown, the outer sleeve 902 is wrapped around the guide member 130, in the area between the ridges 142 (not shown) of the guide member 130. Additionally, the outer sleeve 902 is partially wrapped around the rigging connectors 100 by fastening the fasteners 904 on either end of the outer sleeve 902. The arrows towards the bottom of the diagram indicate the motion of the ends of the outer sleeve 902 in fastening the fasteners 904.

FIG. 9-3 is a perspective view of the example harness sleeve 900 with inner protective sleeve that is installed on rigging connectors 100 (not shown) and guide member 130. As shown the outer sleeve 902 is wrapped around the guide member 130, and partially wrapped around the rigging connectors 100 by fastening the fasteners 904 on either end of the outer sleeve 902. The arrows towards the bottom of the diagram indicate the motion of the ends of the outer sleeve 902 in fastening the fastener 904. Additionally, the strap 908 is secured around the guide member 130, within the region between the ridges 142 (not shown). Because the region between the ridges 142 is below the ridges 142, securing the example harness sleeve 900 with the strap in this region, secures the edge of the outer sleeve 902 below the top edges of the ridges 142. Accordingly, movement of the example harness sleeve 900 along the length of the guide member 130 is mitigated because the ridges 142 provide an impediment to such movement. Additionally, in some embodiments of the present disclosure, a zip tie 1012 may be secured around the strap 1008 such that the zip tie 1012 provides an additional frictional force between the outer sleeve 1002 and the guide member 130.

Figure 10:
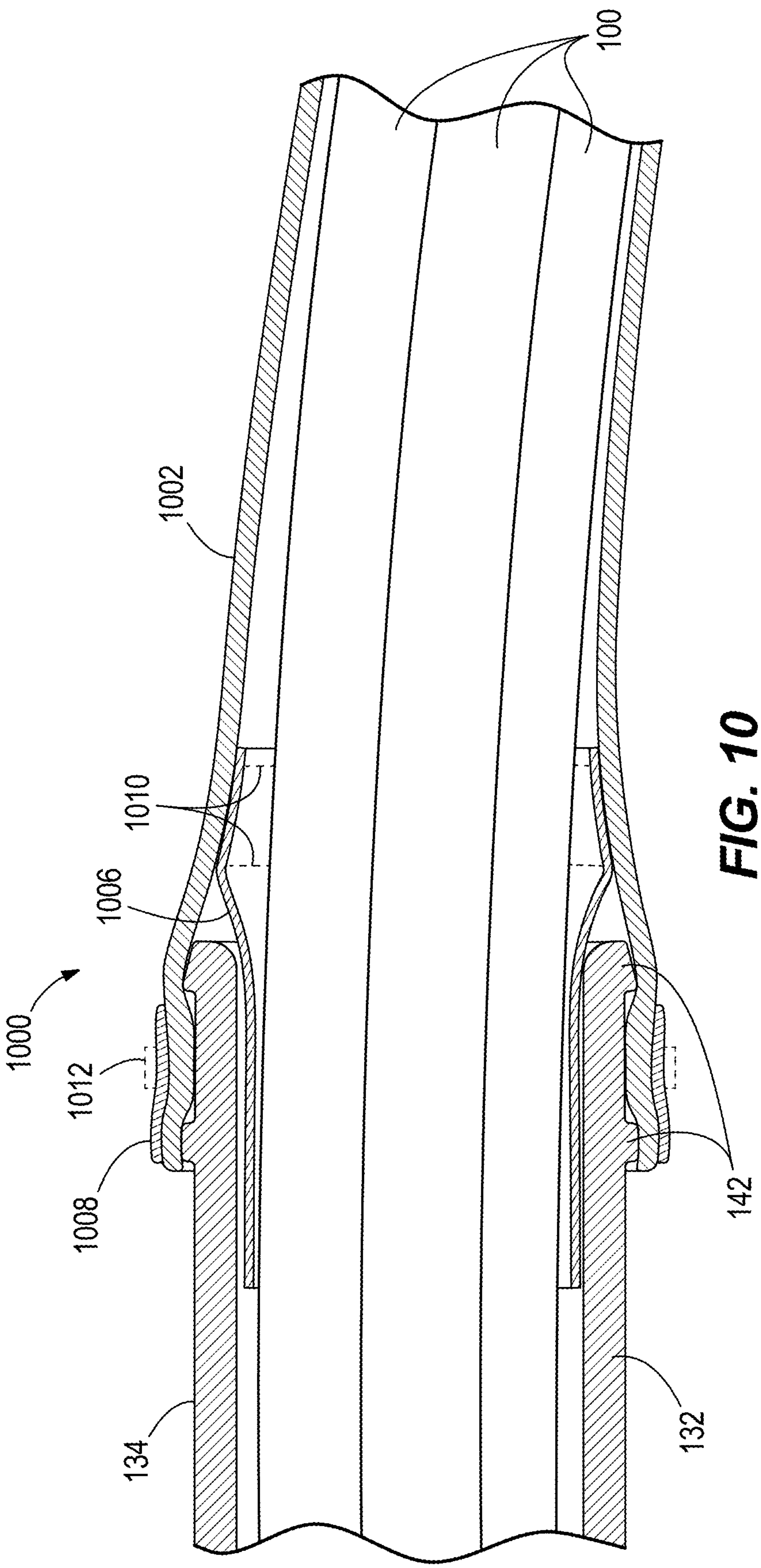
FIG. 10 is a cross-sectional side view of an example harness sleeve that is installed on a rigging and a guide member.

FIG. 10 is a cross-sectional side view of an example harness sleeve 1000 with inner protective sleeve that is installed on rigging connectors 100 and the base member 132 and cover 134 of the guide member 130. As shown, the rigging connectors 100 pass within the guide member 130, the inner protective sleeve 1006, and outer sleeve 1002. As the outer sleeve 1002 is secured outside the guide member 130, the guide member 130 and outer sleeve 1002 may represent a respectively male and female element pairing. Further, the inner protective sleeve 1006 is positioned within the guide member 130. In this way, the inner protective sleeve 1006 and guide member 130 may represent a respectively male and female element pairing. Additionally, the inner protective sleeve 1006 is positioned between the guide member 130 and the rigging connectors 100, preventing contact between the rigging connectors and the end of the guide member 130. Further, the inner protective sleeve 1006 is secured to the outer sleeve 1002 with stitching 1010. Additionally, the outer sleeve 1002 provides a protective barrier between potential hazards, such as weathering, ultraviolet radiation, and other elements, such as fishing hooks, that may cause damage to the protective coating of the rigging connectors 100. Further, because the circumference of the secured outer sleeve 1002 is larger than the circumference of the rigging connectors 100, the outer sleeve 1002 provides a gap between its interior and the exterior of the rigging connectors 100. Accordingly, the example harness sleeve 1000 is prevented from compressing the rigging connectors 100, together, which may cause friction and/or chafing of the rigging connectors 100 against each other. In this way, the example harness sleeve 1000 may provide further protection to the rigging connectors 100.

Some embodiments of a marine drive may be configured with at least one rigging connector that is different from those of the illustrated embodiments. Further, in the illustrated embodiments, the rigging connectors 100 are described as carrying at least one electrical conductor to transmit power from the batteries to the marine drive 50. However, it should be appreciated that at least one of the rigging connectors may be configured with at least one different type of connector in addition or as an alternative to the electrical conductors of the illustrated embodiments. For example, a rigging connector may include at least one of a battery cable, a fuel line, a hydraulic line, a pneumatic line, electrical lines that relay digital steering, throttle and/or other commands to the marine drive, and any other type of cable, wire, or line that extends between the marine vessel and the marine drive.

In the present description, certain terms have been used for brevity, clarity, and understanding. No unnecessary limitations are to be implied therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

What is claimed is:

1. A harness sleeve with inner protective sleeve, comprising:
- an outer sleeve that is configured to be a female pairing to a guide member of a marine drive, wherein the guide member is configured to be a male pairing to the outer sleeve;
- the inner protective sleeve, wherein the inner protective sleeve is configured to be a male pairing to the guide member, wherein the guide member is configured to be a female pairing to the inner protective sleeve; and
- a strap configured to secure the outer sleeve to the guide member.

2. The harness sleeve of claim 1, wherein the inner protective sleeve is configured to surround a plurality of rigging connectors.

3. The harness sleeve of claim 1, wherein the inner protective sleeve provides a barrier between a plurality of rigging connectors and a portion of the guide member.

4. The harness sleeve of claim 1, wherein the outer sleeve is configured to fasten around a plurality of rigging connectors.

5. The harness sleeve of claim 1, wherein the outer sleeve is configured to fasten around the inner protective sleeve.

6. The harness sleeve of claim 1, wherein the outer sleeve is configured to fasten around a plurality of rigging connectors without increasing friction between the plurality of rigging connectors.

7. A harness sleeve with inner protective sleeve, comprising:
- an outer sleeve that is secured to a guide member of a marine drive, wherein the outer sleeve surrounds a plurality of rigging connectors;
- the inner protective sleeve, wherein the inner protective sleeve is attached to the outer sleeve, wherein an end of the inner protective sleeve is disposed at a position within the guide member, wherein a first portion of the inner protective sleeve is disposed between a plurality of rigging connectors and the guide member such that the plurality of rigging connectors is prevented from contacting the guide member; and
- a strap configured to fasten to itself around an end of the outer sleeve to increase a friction between the outer sleeve and the guide member.

8. The harness sleeve of claim 7, wherein the outer sleeve comprises a first fastening element and a second fastening element, wherein the first fastening element fastens to the second fastening element to increase the friction between the outer sleeve and the guide member such that the outer sleeve is secured to a guide member of a marine drive.

9. The harness sleeve of claim 7, comprising an element that attaches the inner protective sleeve to the outer sleeve.

10. The harness sleeve of claim 9, wherein the element prevents:
- the outer sleeve from extending beyond a predetermined position on the guide member; and
- the inner protective sleeve from extending beyond a predetermined position within the guide member.

11. The harness sleeve of claim 7, comprising a stitching that attaches the inner protective sleeve to the outer sleeve, wherein a width of the stitching is equal to a width of the inner protective sleeve.

12. The harness sleeve of claim 7, comprising a stitching that attaches the inner protective sleeve to the outer sleeve, wherein a width of the stitching is less than a width of the inner protective sleeve.

13. The harness sleeve of claim 7, wherein the guide member comprises a pair of ridges at an end of the guide member, and wherein the strap is configured to secure the outer sleeve in a region disposed between the pair of ridges.

14. The harness sleeve of claim 7, wherein a width of the inner protective sleeve approximates a circumference of the plurality of rigging connectors, and the width of the inner protective sleeve is larger than the circumference of the plurality of rigging connectors.

15. The harness sleeve of claim 7, wherein a width of the outer sleeve approximates a circumference of the plurality of rigging connectors, and the width of the outer sleeve is larger than a width of the inner protective sleeve.

16. The harness sleeve of claim 7, wherein, a portion of the outer sleeve is not in contact with the plurality of rigging connectors.

17. The harness sleeve of claim 7, wherein a length of the outer sleeve approximates a length of the plurality of rigging connectors.

18. The harness sleeve of claim 7, wherein the outer sleeve comprises a flexible fabric material.

19. The harness sleeve of claim 7, wherein the outer sleeve comprises a weather resistant material.

20. The harness sleeve of claim 7, wherein the inner protective sleeve comprises a flexible fabric material.

* * * * *